(12) United States Patent
Chen

(10) Patent No.: US 10,862,608 B2
(45) Date of Patent: Dec. 8, 2020

(54) COMMUNICATION DEVICE AND COMMUNICATION METHOD

(71) Applicant: NATIONAL CHENG KUNG UNIVERSITY, Tainan (TW)

(72) Inventor: Chao-Yu Chen, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 15 days.

(21) Appl. No.: 16/209,720

(22) Filed: Dec. 4, 2018

(65) Prior Publication Data

US 2020/0177297 A1 Jun. 4, 2020

(51) Int. Cl.
*H04J 13/00* (2011.01)
*H04L 27/26* (2006.01)
*H04L 25/02* (2006.01)
*H04J 13/10* (2011.01)

(52) U.S. Cl.
CPC ...... *H04J 13/0003* (2013.01); *H04J 13/0014* (2013.01); *H04J 13/10* (2013.01); *H04L 25/024* (2013.01); *H04L 27/2657* (2013.01)

(58) Field of Classification Search
CPC ............... H04L 27/266; H04L 27/2613; H04L 27/2691; H04L 5/0048; H04L 27/2692; H04L 5/005; H04J 11/0076
See application file for complete search history.

(56) References Cited

U.S. PATENT DOCUMENTS

| | | | | |
|---|---|---|---|---|
| 6,263,029 | B1* | 7/2001 | Alard | H04L 1/08 375/340 |
| 8,102,925 | B2* | 1/2012 | Shoemake | H04L 27/2613 375/260 |
| 8,165,185 | B2* | 4/2012 | Zhang | H04L 27/2613 375/135 |
| 9,398,062 | B2* | 7/2016 | Han | H04B 1/56 |
| 10,075,224 | B2* | 9/2018 | Lomayev | H04W 72/0446 |
| 10,298,335 | B1* | 5/2019 | Xin | H04J 13/0014 |
| 10,523,353 | B2* | 12/2019 | Kim | H04L 27/2613 |
| 10,673,555 | B2* | 6/2020 | McElroy | H04B 1/7183 |
| 10,693,583 | B2* | 6/2020 | Lomayev | H04L 23/02 |
| 2004/0202103 | A1 | 10/2004 | Suh et al. | |
| 2005/0233710 | A1* | 10/2005 | Lakkis | H04B 1/71632 455/102 |
| 2009/0285269 | A1* | 11/2009 | Zhang | H04B 1/70735 375/150 |
| 2010/0266053 | A1* | 10/2010 | Sakamoto | H04L 25/0224 375/259 |

(Continued)

OTHER PUBLICATIONS

Chao-Yu Chen, "A Novel Construction of Complementary Sets With Flexible Lengths Based on Boolean Functions." IEEE Communications Letters, vol. 22, Issue: 2, Feb. 2018.

*Primary Examiner* — Syed Ali
(74) *Attorney, Agent, or Firm* — Birch, Stewart, Kolasch & Birch LLP

(57) ABSTRACT

A communication device and a communication method are provided. The communication device includes: a processor configured to generate a Golay complementary set, and a modulator configured to modulate the Golay complementary set to a carrier. Herein, the generated Golay complementary set is generated by using an algebraic structure and has an elastic length, and is adapted to communication application such as channel estimation or signal synchronization.

7 Claims, 2 Drawing Sheets

(56) References Cited

U.S. PATENT DOCUMENTS

2011/0002430 A1* 1/2011 Kim .................. H04B 1/7083
375/362
2011/0019720 A1 1/2011 Fuente
2013/0279448 A1* 10/2013 Kim .................. H04W 56/00
370/329

* cited by examiner

COMMUNICATION DEVICE AND COMMUNICATION METHOD

BACKGROUND

Technical Field

The present invention relates to the field of communication, and in particular, to a communication device and a communication method.

Related Art

Golay complementary sequences have the property that the sum of good aperiodic autocorrelation functions is an impulse function, and are widely used in communication systems. However, the length of a generally constructed Golay complementary sequence based on Boolean functions can only be limited to a power of two, and an application range thereof is limited. For a method for constructing a Golay complementary sequence whose length is not a power of two, currently there are ways to find feasible lengths by means of computer exhaustion, but it takes memory space to record the sequences, and consequently, hardware costs are increased.

SUMMARY

In view of this, embodiments of the present invention provide a communication device and a communication method, so that a Golay complementary set having a length of a power of two or a length that is not a power of two can be constructed by using an algebraic structure.

An embodiment of the present invention provides a communication device, including: a processor configured to generate a Golay complementary set, and a modulator configured to modulate the Golay complementary set to a carrier.

An embodiment of the present invention provides a communication device, including: a demodulator configured to receive a signal and demodulate the signal into a Golay complementary set, and a processor configured to perform channel estimation or signal synchronization according to the Golay complementary set.

An embodiment of the present invention provides a communication method, including: generating a Golay complementary set, and modulating the Golay complementary set to a carrier.

The Golay complementary set is $$\left\{ S + \frac{q}{2}\sum_{\alpha=1}^{k} d_\alpha x_{\pi(m-k+\alpha)} + \frac{q}{2} d_{k+1} x_{\pi(1)} \right\},$$

and a length of the Golay complementary set is $2^{m-1} + \sum_{\alpha=1}^{k-1} a_\alpha 2^{\pi(m-k+\alpha)-1} 2^v$, where S is a sequence constructed by a generalized Boolean function f. The generalized Boolean function is $$f = \frac{q}{2}\sum_{i=1}^{m-k-1} x_{\pi(i)} x_{\pi(i+1)} + \sum_{\alpha=1}^{k} \sum_{i=1}^{m-k} \lambda_{\alpha,i} x_{\pi(m-k+\alpha)} x_{\pi(i)} + \sum_{i=1}^{m} g_i x_i + g_0,$$

where $a_\alpha, d_\alpha \in \{0, 1\}$, $\lambda_{\alpha, i}, g_i \in \mathbb{Z}_q$, m and v are positive integers, q is a positive even number, m≥2, k<m, 0≤v≤m−k, π is an arrangement of {1, 2, ..., m}, and the following conditions are met:

condition 1: $\pi(m-k+1) < \pi(m-k+2) < \ldots < \pi(m-1) < \pi(m) = m$;

condition 2: if v>0, then $\{\pi(1), \pi(2), \ldots, \pi(v)\} = \{1, 2, \ldots, v\}$, or v=0; and condition 3: for all α=1, 2, ..., k−1, if $\pi(t) < \pi(m-k+\alpha)$, then $\pi(t-1) < \pi(m-k+\alpha)$, where 2≤t≤m−k.

According to the communication device and the communication method provided in the embodiments of the present invention, a Golay complementary set having an elastic length can be constructed by using an algebraic structure, so that wider application requirements can be met, and storage hardware costs can be reduced.

DETAILED DESCRIPTION

Figure 1:
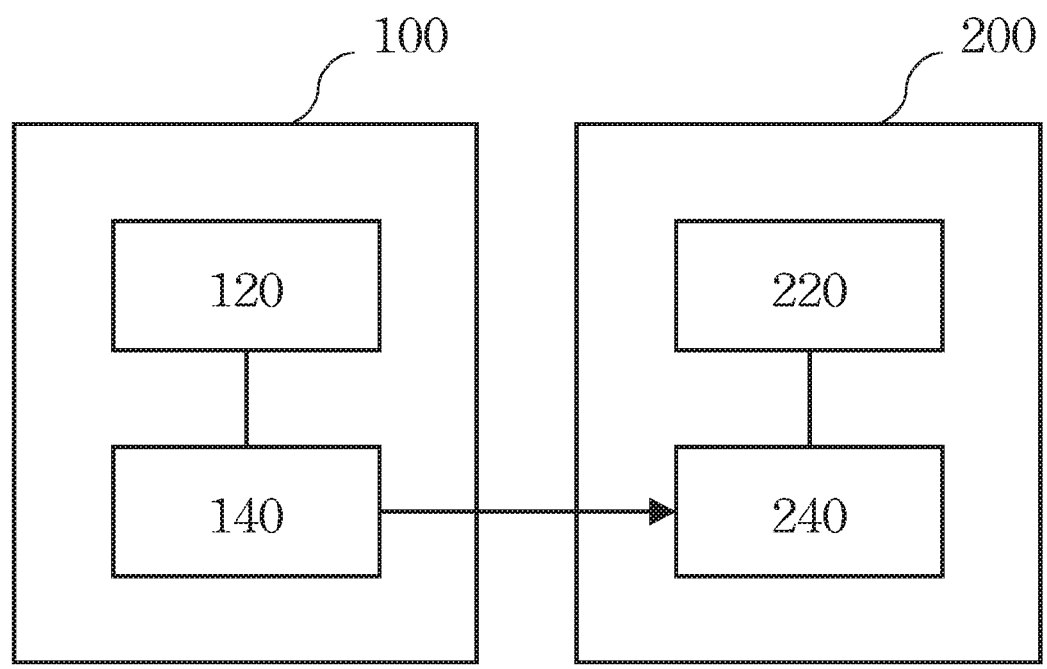
FIG. 1 is a schematic block diagram of a communication device according to an embodiment of the present invention.

According to a communication device and a communication method provided in the present invention, Golay complementary sets (GCSs) having elastic lengths can be constructed, and lengths thereof are no longer limited to lengths of powers of two, and construction is performed by using an algebraic method, so that each sequence set does not need to be additionally stored by using a memory.

An algebraic structure of the Golay complementary set is described herein. The Golay complementary set is $$\left\{ S + \frac{q}{2}\sum_{\alpha=1}^{k} d_\alpha x_{\pi(m-k+\alpha)} + \frac{q}{2} d_{k+1} x_{\pi(1)} \right\},$$

and the length of the Golay complementary set is $2^{m-1} + \sum_{\alpha=1}^{k-1} a_\alpha 2^{\pi(m-k+\alpha)-1} + 2^v$. The size of the Golay complementary set is $2^{k+1}$ that is, there are $2^{k+1}$ sequences in the Golay complementary set. Herein, S is a sequence constructed by a generalized Boolean function f. The generalized Boolean function is $$f = \frac{q}{2}\sum_{i=1}^{m-k-1} x_{\pi(i)} x_{\pi(i+1)} + \sum_{\alpha=1}^{k} \sum_{i=1}^{m-k} \lambda_{\alpha,i} x_{\pi(m-k+\alpha)} x_{\pi(i)} + \sum_{i=1}^{m} g_i x_i + g_0,$$

where $a_\alpha, d_\alpha \in \{0,1\}$, $\lambda_{\alpha,i}, g_i \in \mathbb{Z}_q$, m and v are positive integers, q is a positive even number, m≥2, k<m, 0≤v≤m−k, π is an arrangement of {1, 2, ..., m}. In addition, the following conditions are met: (1) $\pi(m-k+1) < \pi(m-k+2) < \ldots < \pi(m-1) < \pi(m) = m$; (2) if v>0, then $\{\pi(1), \pi(2), \ldots, \pi(v)\} = \{1, 2, \ldots, v\}$, or v=0; and (3) for all α=1, 2, ..., k−1, if $\pi(t) < \pi(m-k+\alpha)$, then $\pi(t-1) < \pi(m-k+\alpha)$, where 2≤t≤m−k.

For example, when q=2, m=5, k=2, and π(1)=1, π(2)=2, π(3)=3, π(4)=4, and π(5)=5, it is assumed that the Boolean function is $f=x_1 x_2 + x_2 x_3$, the Golay complementary set is {S, $S+x_1$, $S+x_4$, $S+x_5$, $S+x_1+x_4$, $S+x_1+x_5$, $S+x_4+x_5$, $S+x_1+x_4+x_5$}. In this case, π(4)<π(5)=5, and the foregoing condition (1) is met. Moreover, for t=2, 3, π(t)<π(m−k+1)=π(4)=4, and π(t−1)<π(4), and the foregoing condition (3) is met. Furthermore, obviously, v=1, 2, 3 also meets the foregoing condition (2). Therefore, the Golay complementary set whose size is 8 is constructed with a length of $2^4+a_1 2^3+2^v$, $a_1 \in \{0,1\}$, and $v \in \{0,1,2,3\}$. For example, if $a_1$ and v are 0, then the length is 16+0+1=17; if a1 is 1 and v is 2, then the length is 16+8+4=28. Therefore, the Golay complementary sets having lengths of 17, 18, 20, 24, 25, 26, 28, and 32 may be constructed. The peak-to-average power ratios (PAPRs) of the Golay complementary sets are respectively 4.76, 5.56, 5, 6, 6.76, 7.54, 7, and 8.

Next, an application manner of the foregoing Golay complementary set is described. FIG. 1 is a schematic block diagram of a communication device according to an embodiment of the present invention. In this example, a communication device 100 sends a wireless signal to a communication device 200. The communication device 100 includes a processor 120 and a modulator 140 coupled to each other. The communication device 200 includes a processor 220 and a demodulator 240 coupled to each other. However, in some embodiments, the communication device 100 may also include a demodulator to serve as a signal receiving end, whereas the communication device 200 may also include a modulator to serve as a signal transmitting end.

Figure 2:
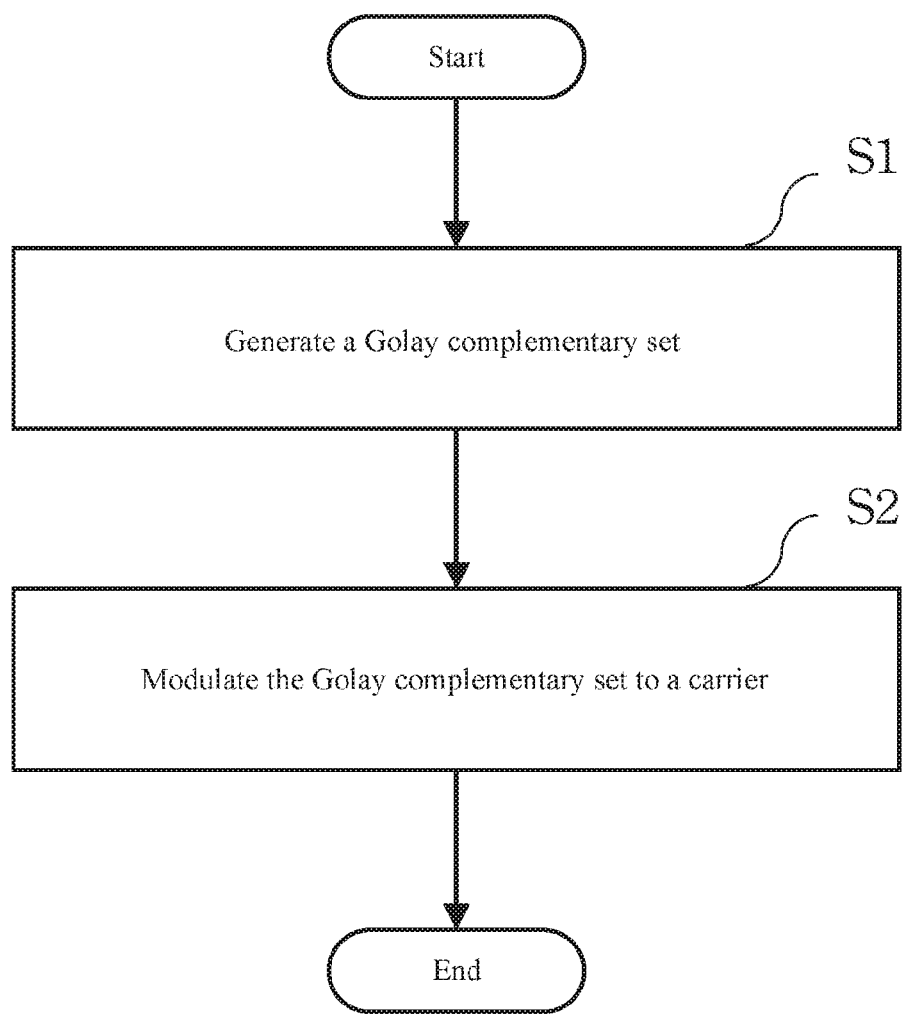
FIG. 2 is a flowchart of a communication method according to an embodiment of the present invention.

Reference is made to both FIG. 1 and FIG. 2. FIG. 2 is a flowchart of a communication method according to an embodiment of the present invention. The processor 120 of the communication device 100 may perform the foregoing algebraic operation to generate the Golay complementary set having a desired length (step S1). The modulator 140 of the communication device 100 modulates the Golay complementary set to a carrier (step S2). A complementary sequence has a low peak-to-average power ratio. Therefore, when the Golay complementary set is placed in a frequency domain, a signal converted to time may have the low peak-to-average power ratio. In the step S2, an orthogonal frequency-division multiplexing (OFDM) technology is used as an example. After the Golay complementary set having the desired length is generated, the Golay complementary set serves as a synchronization sequence, and orthogonal frequency-division multiplexing modulation is performed to generate orthogonal frequency-division multiplexing symbols; and cyclic prefixes (CPs) are added to the front of the orthogonal frequency-division multiplexing symbols and then the orthogonal frequency-division multiplexing symbols are separately sent by using a plurality of antennas.

The demodulator 240 of the communication device 200 performs demodulation after receiving the signal. The processor 220 of the communication device 200 may perform channel estimation, signal synchronization, or the like by using the demodulated Golay complementary set. For example, using a 4G LTE-A system as an example, the sequence length of the synchronization signal is 62. Using a 3GPP NB-IoT technology as an example, first and second synchronization signals use Zadoff-Chu sequences whose lengths are respectively 11 and 132. In the construction manner of the present invention, Golay complementary sets having the same length can also be generated, that is, 8+2+1=11 and 128+4=132.

In some embodiments, the Golay complementary set may serve as a channel estimation sequence.

In conclusion, the embodiments of the present invention provide a communication device and a communication method, so that a Golay complementary set having an elastic length can be constructed by using an algebraic structure, and wider application requirements can be met, and storage hardware costs can be reduced.

What is claimed is:

1. A communication device, comprising:
   a processor, configured to generate a Golay complementary set; and
   a modulator, configured to modulate the Golay complementary set to a carrier, wherein the Golay complementary set is $$\left\{ S + \frac{q}{2} \sum_{\alpha=1}^{k} d_\alpha x_{\pi(m-k+\alpha)} + \frac{q}{2} d_{k+1} x_{\pi(1)} \right\},$$

and a length of the Golay complementary set is $2^{m-1} + \Sigma_{\alpha=1}^{k-1} a_\alpha 2^{\pi(m-k+\alpha)-1} + 2^v$, wherein S is a sequence constructed by a generalized Boolean function f, the generalized Boolean function being $$f = \frac{q}{2} \sum_{i=1}^{m-k-1} x_{\pi(i)} x_{\pi(i+1)} + \sum_{\alpha=1}^{k} \sum_{i=1}^{m-k} \lambda_{\alpha,i} x_{\pi(m-k+\alpha)} x_{\pi(i)} + \sum_{i=1}^{m} g_i x_i + g_0;$$

$a_\alpha, d_\alpha \in \{0, 1\}$, $\lambda_{\alpha,i}, g_i \in \mathbb{Z}_q$, m and v are positive integers, q is a positive even number, m≥2, k<m, 0≤v≤m−k, π is an arrangement of $\{1, 2, \ldots, m\}$, and the following conditions are met:

condition 1: π(m−k+1)<π(m−k+2)< . . . <π(m−1)<π(m)=m;

condition 2: if v>0, then $\{\pi(1), \pi(2), \ldots, \pi(v)\} = \{1, 2, \ldots, v\}$, or v=0; and condition 3: for all α=1, 2, . . . , k−1, if π(t)<π(m−k+α), then π(t−1)<π(m−k+α), wherein 2≤t≤m−k, wherein the Golay complementary set is generated without a need to store each sequence of the Golay complementary set in a memory, thereby reducing storage hardware costs.

2. The communication device according to claim 1, wherein the Golay complementary set serves as a synchronization sequence.

3. The communication device according to claim 1, wherein the Golay complementary set serves as a channel estimation sequence.

4. A communication device, comprising:
   a demodulator, configured to receive a signal and demodulate the signal into a Golay complementary set; and
   a processor, configured to perform channel estimation or signal synchronization according to the Golay complementary set, wherein the Golay complementary set is $$\left\{ S + \frac{q}{2} \sum_{\alpha=1}^{k} d_\alpha x_{\pi(m-k+\alpha)} + \frac{q}{2} d_{k+1} x_{\pi(1)} \right\},$$

and a length of the Golay complementary set is $2^{m-1} + \Sigma_{\alpha=1}^{k-1} a_\alpha 2^{\pi(m-k+\alpha)-1} + 2^v$, wherein S is a sequence constructed by a generalized Boolean function f, the generalized Boolean function being $$f = \frac{q}{2}\sum_{i=1}^{m-k-1} x_{\pi(i)}x_{\pi(i+1)} + \sum_{\alpha=1}^{k}\sum_{i=1}^{m-k} \lambda_{\alpha,i}x_{\pi(m-k+\alpha)}x_{\pi(i)} + \sum_{i=1}^{m} g_i x_i + g_0;$$

$a_\alpha$, $d_\alpha \in \{0, 1\}$, $\lambda_{\alpha,i}$, $g_i \in \mathbb{Z}_q$, m and v are positive integers, q is a positive even number, m≥2, k<m, 0≤v≤m−k, it is an arrangement of $\{1, 2, \ldots, m\}$, and the following conditions are met:

condition 1: $\pi(m-k+1)<\pi(m-k+2)<\ldots<\pi(m-1)<\pi(m)=m$;

condition 2: if v>0, then $\{\pi(1), \pi(2), \ldots, \pi(v)\} = \{1, 2, \ldots, v\}$, or v=0; and condition 2: for all α=1, 2, ..., k−1, if $\pi(t)<\pi(m-k+\alpha)$, then $\pi(t-1)<\pi(m-k+\alpha)$, wherein 2≤t≤m−k, wherein the Golay complementary set is generated without a need to store each sequence of the Golay complementary set in a memory, thereby reducing storage hardware costs.

5. A communication method, comprising:
generating a Golay complementary set; and
modulating the Golay complementary set to a carrier, wherein
the Golay complementary set is and $$\left\{S + \frac{q}{2}\sum_{\alpha=1}^{k} d_\alpha x_{\pi(m-k+\alpha)} + \frac{q}{2}d_{k+1}x_{\pi(1)}\right\},$$

and
a length of the Golay complementary set is $2^{m-1}+\Sigma_{\alpha=1}^{k-1}a_\alpha 2^{\pi(m-k+\alpha)-1}+2^v$, wherein S is a sequence constructed by a generalized Boolean function f, the generalized Boolean function being $$f = \frac{q}{2}\sum_{i=1}^{m-k-1} x_{\pi(i)}x_{\pi(i+1)} + \sum_{\alpha=1}^{k}\sum_{i=1}^{m-k} \lambda_{\alpha,i}x_{\pi(m-k+\alpha)}x_{\pi(i)} + \sum_{i=1}^{m} g_i x_i + g_0;$$

$a_\alpha$, $d_\alpha \in \{0, 1\}$, $\lambda_{\alpha,i}$, $g_i \in \mathbb{Z}_q$, m and v are positive integers, q is a positive even number, m≥2, k<m, 0≤v≤m−k, π is an arrangement of $\{1, 2, \ldots, m\}$, and the following conditions are met:

condition 1: $\pi(m-k+1)<\pi(m-k+2)<\ldots<\pi(m-1)<\pi(m)=m$;

condition 2: if v>0, then $\{\pi(1), \pi(2), \ldots, \pi(v)\} = \{1, 2, \ldots, v\}$, or v=0; and condition 2: for all α=1, 2, ..., k−1, if $\pi(t)<\pi(m-k+\alpha)$, then $\pi(t-1)<\pi(m-k+\alpha)$, wherein 2≤t≤m−k, wherein the Golay complementary set is generated without a need to store each sequence of the Golay complementary set in a memory, thereby reducing storage hardware costs.

6. The communication method according to claim 5, wherein the Golay complementary set serves as a synchronization sequence.

7. The communication method according to claim 5, wherein the Golay complementary set serves as a channel estimation sequence.

* * * * *